United States Patent [19]

Gohr

[11] Patent Number: 4,684,433

[45] Date of Patent: Aug. 4, 1987

[54] SLITTER TAPE APPLICATOR

[75] Inventor: Robert A. Gohr, Delafield, Wis.

[73] Assignee: Kempsmith Machine Company, Milwaukee, Wis.

[21] Appl. No.: 719,885

[22] Filed: Apr. 3, 1985

[51] Int. Cl.[4] .............................................. B32B 31/00

[52] U.S. Cl. .................................... 156/517; 156/259; 156/271; 156/324; 156/499

[58] Field of Search ............... 156/510, 514, 516, 517, 156/259, 271, 324, 499; 281/29; 412/3, 17; 493/212

[56] References Cited

U.S. PATENT DOCUMENTS

| | | | |
|---|---|---|---|
| 2,831,706 | 4/1958 | Miller | 281/29 X |
| 3,195,924 | 7/1965 | Carter et al. | 281/29 |
| 3,548,723 | 12/1970 | Sengewald | 156/510 X |
| 4,147,380 | 4/1979 | Nelson | 156/259 X |

*Primary Examiner*—David Simmons
*Attorney, Agent, or Firm*—Ronald E. Barry

[57] ABSTRACT

An apparatus for applying tape to a moving press board web including a base for carrying a press board web, a slitter mounted on the base for cutting the web into three strips, a tape applicator for applying a strip of tape to the center strip, the tape being wide enough to overlap the edges of the adjacent strips, a second slitter for cutting the center strip in half and a die for cutting the strips into predetermined lengths.

1 Claim, 16 Drawing Figures

SLITTER TAPE APPLICATOR

BACKGROUND OF THE INVENTION

The present invention relates to file folders of the type having front and back covers, either of the reinforced edge or reinforced hinge type. Each type of file folder is manufactured from a pressboard web that is passed through a tape applicator for applying a tape to one edge of the web and then fed into a die where the cover is cut to length and punched. If a reinforced hinge type cover is being manufactured, a separate pressboard strip is fed to the tape applicator along with the pressboard web and the tape applied to the strip and web to form a hinge between the tape of the web after the web has been cut to length and punched. Each of these pieces of equipment has a maximum capability of producing approximately 6,000 covers per 8-hour shift.

SUMMARY OF THE INVENTION

The apparatus of the present invention can be used to manufacture covers for file folders either of the reinforced edge or reinforced hinge type. The apparatus produces both a front and back cover simultaneously of either type and operates at speeds up to 6,000 units per hour. A single pressboard web is fed to the apparatus and a double-cut is made in the center of the web to form the reinforcing strip if the file folder is to be a reinforced hinge type folder. A single strip of tape is applied to the center of the pressboard web for both types of folders and the web fed to a die to cut the covers to length and to punch the edge. The web is then split down the middle of the tape to form the front and back cover for either a reinforced edge or a reinforced hinge file folder.

IN THE FIGURES

DESCRIPTION OF THE INVENTION

Figure 1:
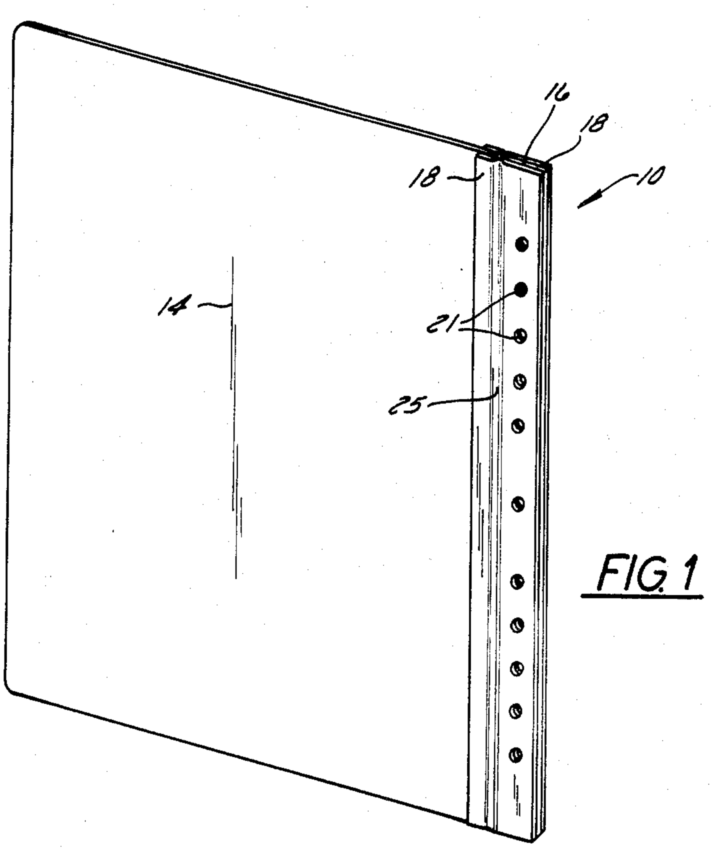
FIG. 1 is a perspective view of a file folder cover of the reinforced hinge type formed by the apparatus of the present invention.
Figure 2:
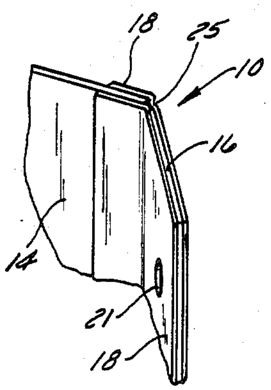
FIG. 2 is an enlarged perspective view of a corner of one cover of the folder of FIG. 1 showing the reinforced hinge arrangement.
Figure 4:
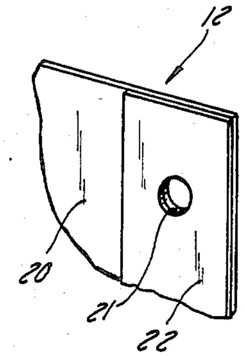
FIG. 4 is an enlarged view in perspective of the upper corner of one cover of the file folder of FIG. 3.
Figure 3:
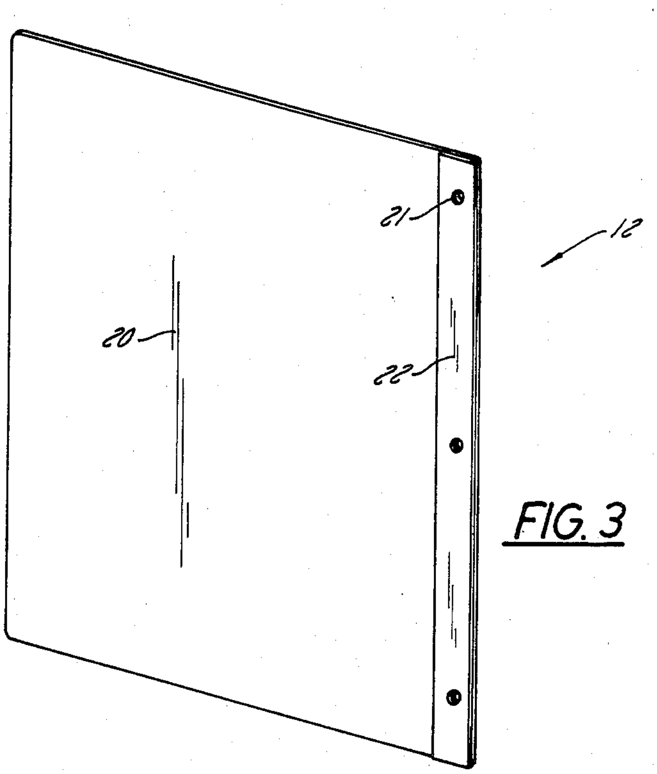
FIG. 3 is a perspective view of a file folder of the reinforced edge type made from the apparatus of the present invention.

File folder covers of the type contemplated herein are of two general types. Hinged, double tape files 10 as seen in FIGS. 1 and 2 or tape reinforced edge file 12 as seen in FIGS. 3 and 4. The hinged double tape files 10 each include a cover blank 14 connected to a reinforced hinge strip 16 by means of tape 18 applied to both sides of the blank 14 and strip 16. The tape reinforced edge files 12 include a cover blank 20 having a heat activated adhesive tape 22 applied to one side of the blank as seen in FIGS. 3 and 4 or to both sides of the blank if desired.

Figure 5:
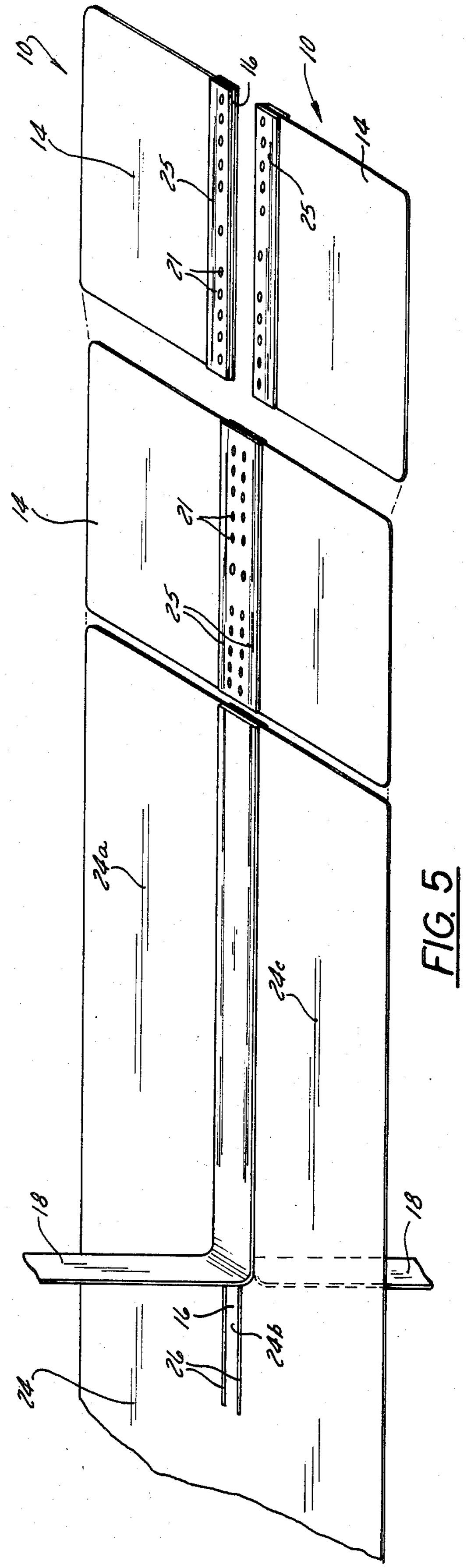
FIG. 5 is a perspective view of the web used for making the file folder covers shown in FIG. 1 with a tape being applied to both sides of the web.

Referring to FIG. 5, a schematic view of the stages of the web 24 in forming the hinged, double tape covers 10 is shown. The pressboard web 24 is shown with two slots 26 being cut in the center of the web to form three continuous strips 24*a*, 24*b*, 24*c* and a strip of tape 18 being applied to both the upper and lower surfaces of the web to hold the strips together. The tape 18 is pressed together to form the tape hinges 25 in the slots 26 between the blanks 14 and the reinforced strip 16. The web is fed into a die (not shown) and the covers 14 are cut to length and punched to form the holes 21. The center strip 24*b* is then cut down the center to form the front and back covers 14 of the file folder.

Figure 6:
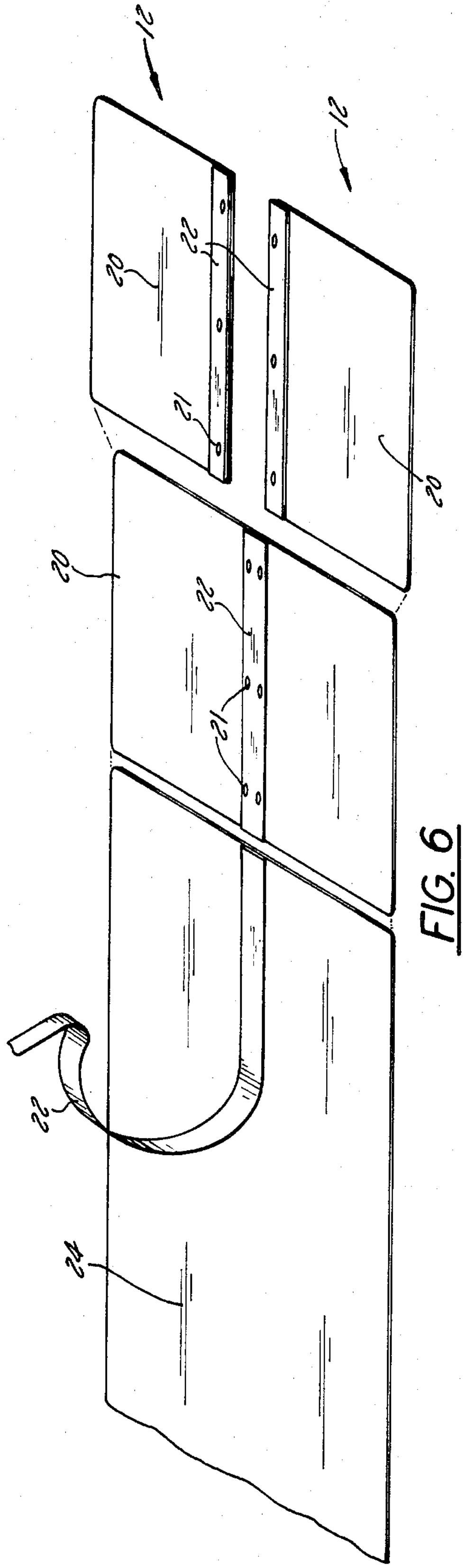
FIG. 6 is a view of a web showing the file folder covers of the type shown in FIG. 3 with a tape applied to only one side of the web.

Referring to FIG. 6, a schematic view of the stages of the web 24 in forming the reinforced edge covers 12 are shown. The web 24 is shown with single tape 22 being applied to the upper surface of the web. The file folder covers 20 are cut to length in a die and the web cut in half. A second tape 22 can be applied to the bottom of the web if desired.

Figure 7:
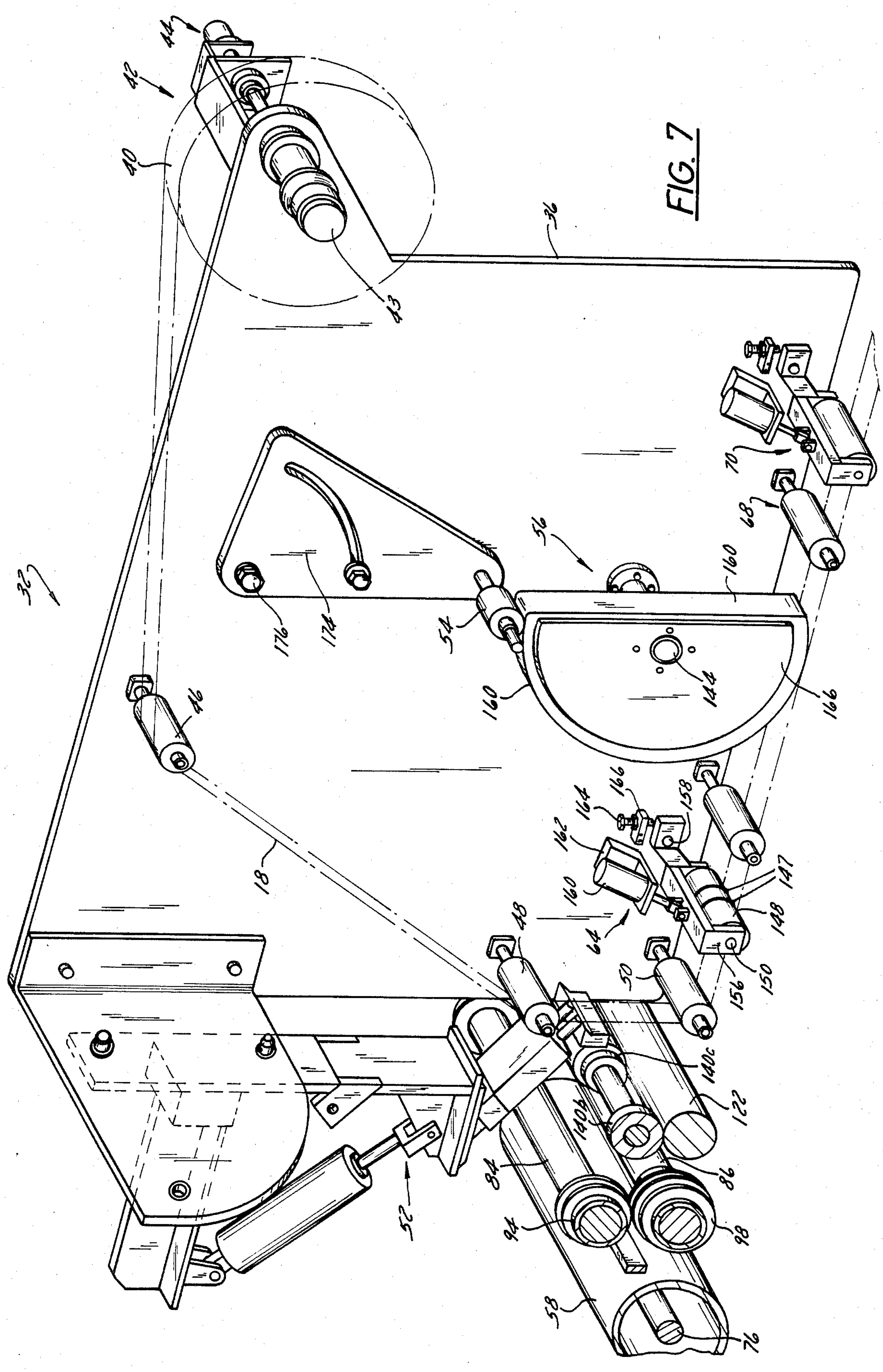
FIG. 7 is a perspective view of the tape applicator apparatus according to the present invention.
Figure 8:
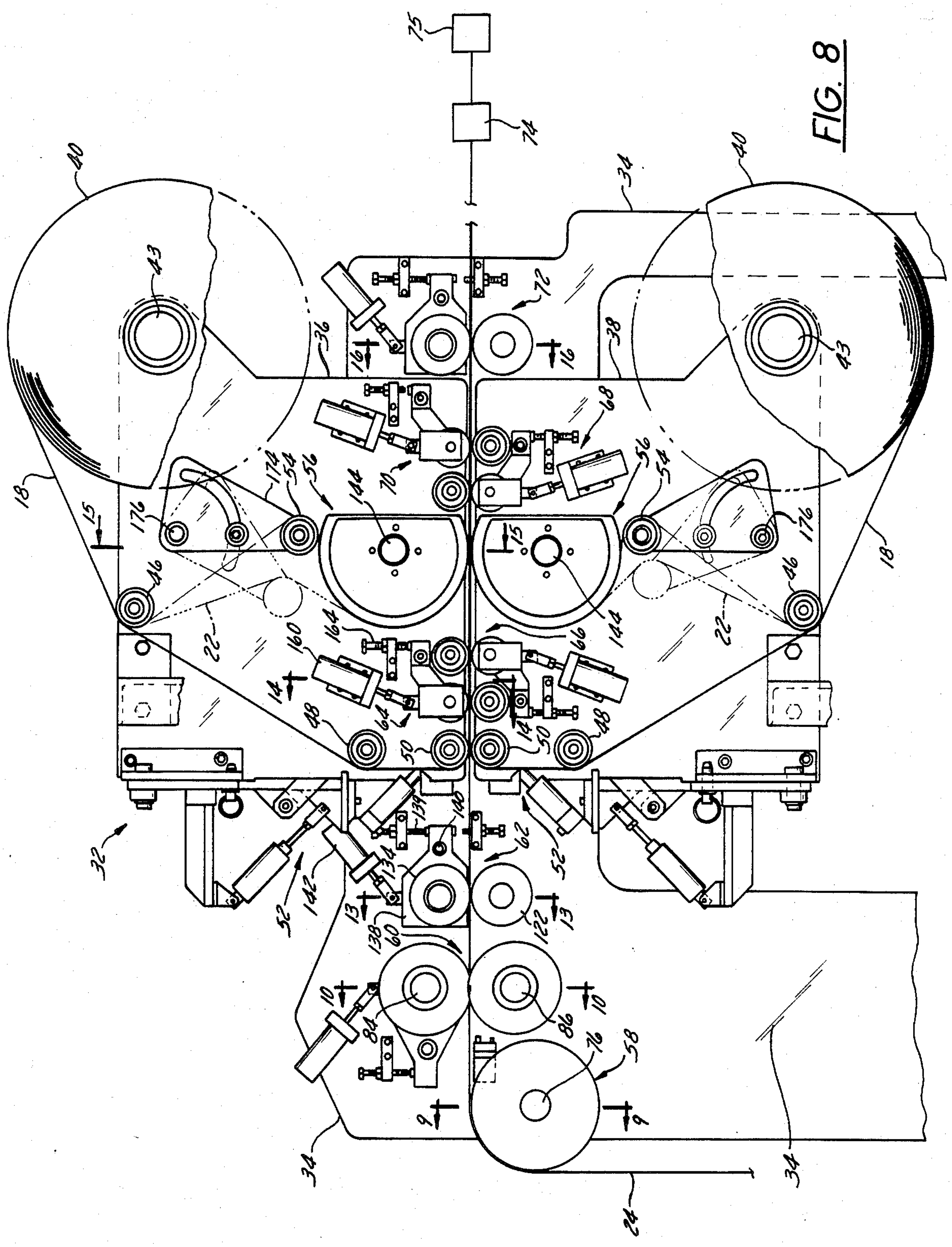
FIG. 8 is a side view in elevation showing an upper and a lower tape applicator apparatus of the present invention.
Figure 9:
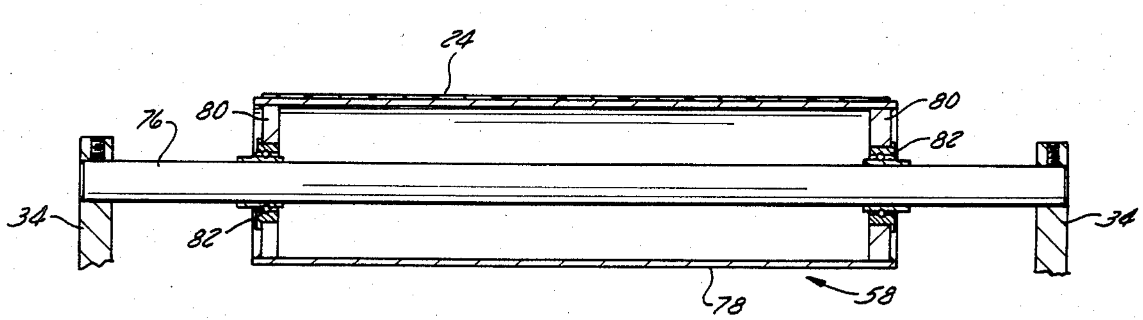
FIG. 9 is a view taken on line 9—9 of FIG. 8 showing a cross-section of the idler roll.

The slitter tape applicator apparatus 32 according to the present invention performs the slitting and tape applicating functions required for either the reinforced edge covers or the reinforced hinge covers at speeds which make it possible to produce in one hour as many file folder covers as previously made in one day. Referring to FIGS. 7 and 8, the apparatus 32 includes a base 34 which is used to support upper and lower mounting panels 36 and 38. Each panel includes a tape roll 40 supported for rotary motion on the panel by means of a tape support assembly 42. The suport assembly includes a shaft 43 which is damped by means of a friction drag assembly 44 mounted on the end of the shaft 43 to maintain tension on the tape roll. The tape 18 is threaded around idler rolls 46, 48 and 50. Hot glue can be applied to the tape 18 by means of a glue applicator 52 mounted on the panel for movement into engagement with or away from the tape 18. If heat sensitive Mylar tape 22 is used, it is threaded around idler roll 46, a movable idler roll assembly 54 and around the outer periphery of tape heater 56.

REINFORCED HINGE FILE FOLDER

The pressboard web 24 is fed into the apparatus 32 over an idler roll 58, and fed through a slitter assembly 60, a press roll assembly 62, pressure roll assemblies 64, 66, 68 and 70, and a final drive roll assembly 72. The press board web after leaving the slitter tape applicator apparatus moves into a die 74 where the covers are cut to length and punched and then through a final slitter assembly 75 where the web is cut in half.

Means are provided for guiding the pressboard web 24 into the slitter assembly 60. Such means is in the form of the idler roll 58 which is mounted for rotary motion on a shaft 76 mounted on the base 34. The idler roll includes a cylindical tube 78 having end plates 80 mounted for rotary motion on roller bearings 82 provided on the shafts 76.

Figure 10:
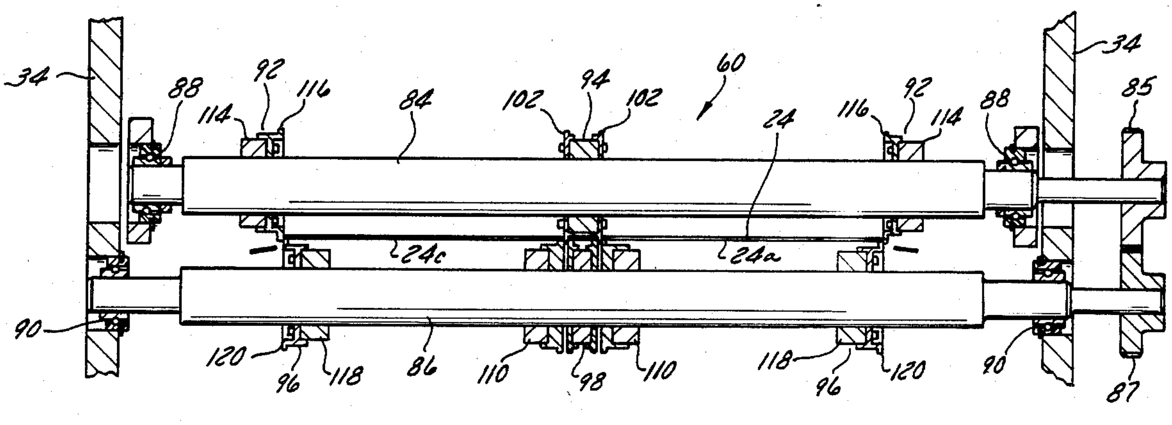
FIG. 10 is a view taken on line 10—10 of FIG. 8 showing the slitter roll assemblies.
Figure 11:
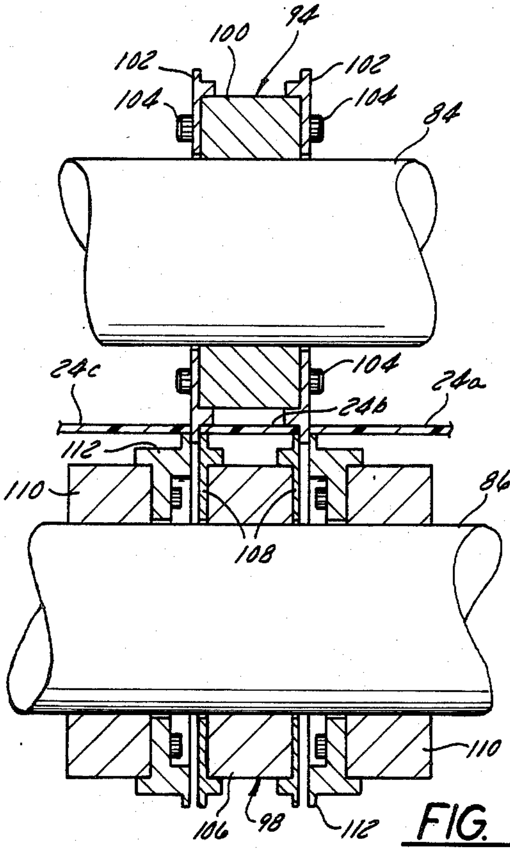
FIG. 11 is an enlarged view of a portion of the double slitter assembly shown in FIG. 10.
Figure 12:
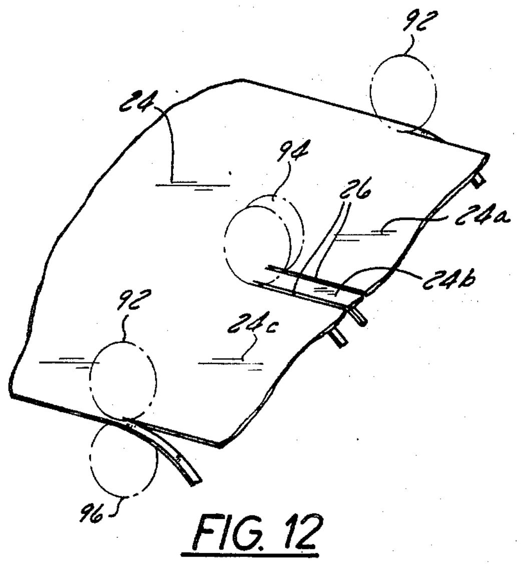
FIG. 12 is a perspective view of a portion of the web shown passing through the slitter roll assemblies.

The web 24 is intially cut into the three strips 24*a*, 24*b*, and 24*c* by means of the slitter assembly 60. Referring to FIGS. 10, 11 and 12, the slitter assembly 60 includes an upper shaft 84 and a lower shaft 86 mounted for rotation in ball bearings 88 and 90, respectively, provided in the base 34. The upper shaft includes an edge cutter 92 mounted on each end of the shaft and a double slot cutter 94 mounted at the center of the shaft. The lower shaft 86 has an edge cutter 96 located on each end of the shaft and a double slot cutter 98 in the center of the shaft. The edge cutters 92 and 96 can be spaced apart a distance up to 32 inches.

Referring specifically to FIG. 11, the double slot cutter 94 includes an annular ring 100 mounted on the shaft 84 and a circular cutter blade 102 secured to each side of the ring 100 by bolts 104. The double slot cutter 98 is provided on the shaft 86 and includes an inner annular ring 106 having a first pair of cutter blades 108 mounted on the ring 106 in a position to cooperate with the inside edges of the blades 102 in the cutter 94 and a pair of outer rings 110 mounted on the shaft 86 with a second pair of cutter blades 112 mounted on the rings 110 in a position to cooperate with the outer edges of the blades 102 on the double cutter 94. The slots 26 are cut in the web 24 on rotary movement of the blades 102 into the spaces provided between the blades 108 and 112.

Each of the upper edge cutters 92 includes an annular ring 114 having a cutter blade 116. Each of the lower edge cutters 96 includes an annular ring 118 having cutter blades 120 mounted in a position to engage the inside edge of the blades 116 on the upper edge cutters 92. Shafts 84 and 86 are driven at a speed corresponding to the speed of the web 24 by means of drive gears 85 and 87 mounted on the ends of the shafts 84 and 86.

Figure 13:
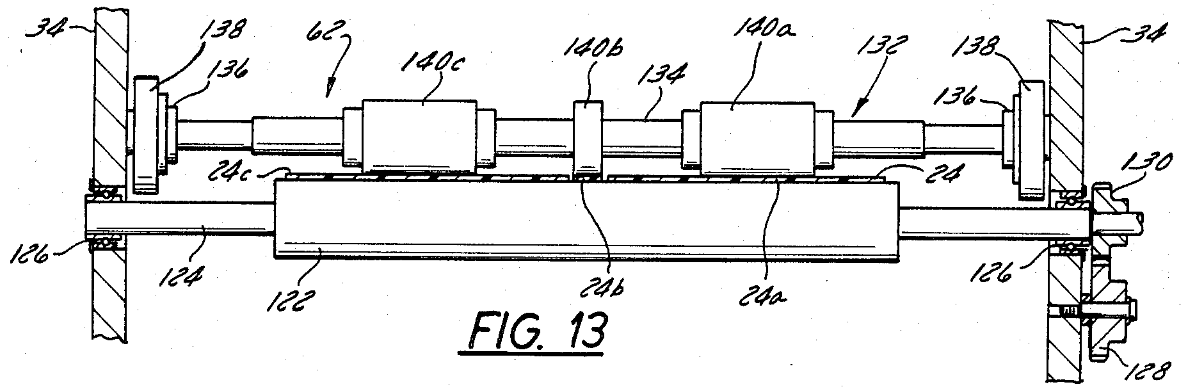
FIG. 13 is a section view taken on line 13—13 of FIG. 8 showing the drive roll assembly.

After the press board web 24 leaves the slitter assembly 60, the web passes through guide roll assembly 62. Referring to FIG. 13, it will be noted that the guide roll assembly 62 includes a drive cylinder 122 and a pressure roll assembly 132. The drive cylinder 122 is mounted on a shaft 124 that is supported for rotary motion in ball bearings 126 provided in the base 34. The cylinder 122 is driven by means of a gear 128 operatively connected to a drive gear 130 mounted on the end of the shaft 124. In this regard, it should be noted that all of the drive gears are driven at a speed which corresponds to the speed of the web 24 through a conventional drive train.

The pressure roll assembly 132 includes a shaft 134 mounted for rotary movement in ball bearings 136 provided in brackets 138. Resilient pressure rolls 140*a*, 140*b* and 140*c* are mounted on the shaft 134 to ride on the press board strips 24*a*, 24*b*, 24*c* respectively. As seen in FIG. 8, the brackets 138 are mounted for pivotal movement about pivot pins 140 provided in the base 34. The pressure roll assembly 132 is raised and lowered by means of a pneumatic cylinder 142 connected to the bracket 138. The assembly 132 is raised to clear the web. The pressure of the rolls is limited by means of a set screw 139 mounted on the base 34.

Figure 16:
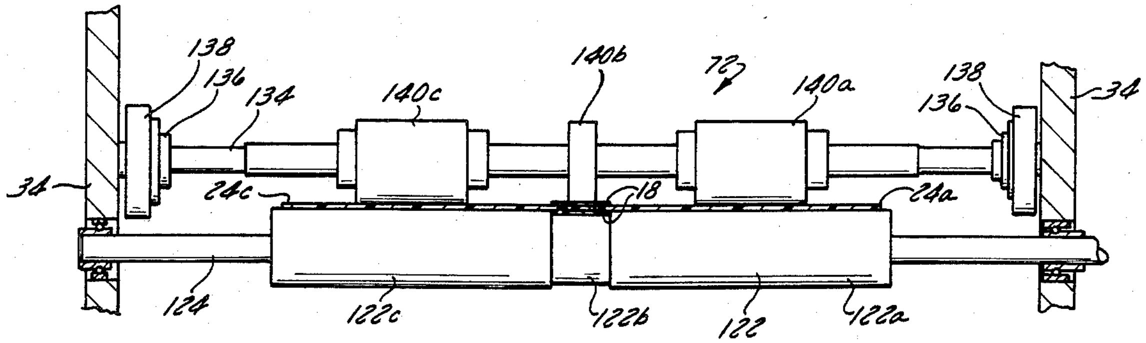
FIG. 16 is a view taken on line 16—16 of FIG. 8 showing the final pressure roll assembly.

The final drive assembly 72 shown in FIG. 16 is substantially identical to the drive assembly 62. The only difference is in drive roll 122 which has been divided into three sections 122*a*, 122*b* and 122*c*. The center section 122*b* having a smaller diameter to accommodate tape 18 on the bottom of the web.

Figure 14:
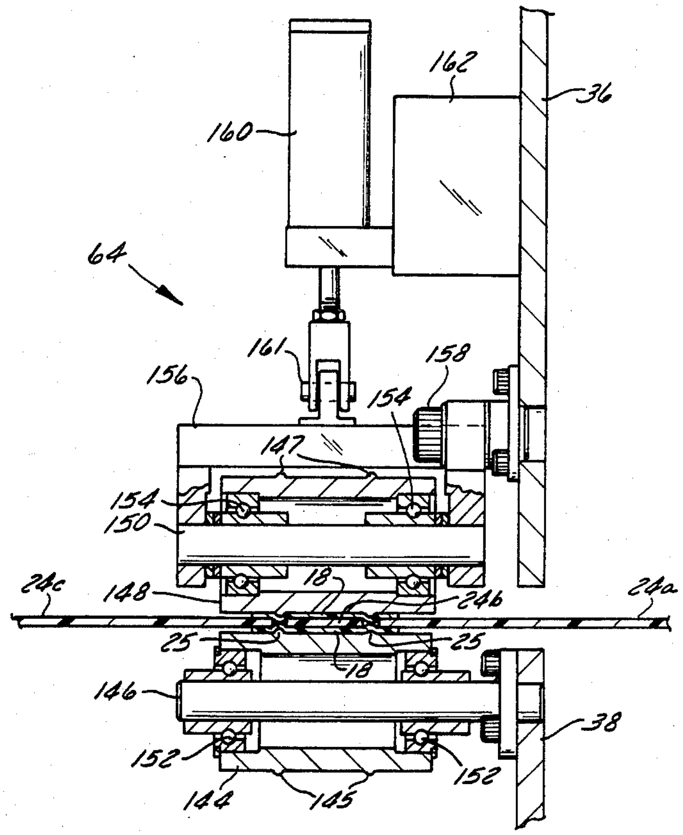
FIG. 14 is a view taken on line 14—14 of FIG. 8 showing the press roll assembly.

The tape 18 is pressed against the web 24 by means of a first set of pressure roll assemblies 64 and 66. Each of the tape pressure roll assemblies is substantially identical and only press roll assembly 64 will be described herein. Referring to FIG. 14, the tape press roll assembly 64 includes a lower idler roll 144 mounted on a shaft 146 and an upper idler roll 148 mounted on a shaft 150. The shaft 146 is mounted on the lower panel 38 and includes a pair of roller bearings 152 to support the roll 144. It should be noted that the center strip 24*b* is held in place by tape 18 provided on both the upper and lower surface of the web. The upper press roll 148 is supported on roller bearings 154 provided on the shaft 150. The shaft 150 is mounted in a bracket 156 that is pivotally mounted on a pin 158 provided in the upper panel 36. The bracket 156 is pivoted by means of a pneumatic cylinder 160 connected to bracket 156 by a pin 161 and is mounted on a bracket 162 secured to the panel 36. The pressure of the roll 148 against the idler roll 144 is controlled by means of a screw 164 mounted in a bracket 166 on the panel 36 in a position to engage the upper portion of the bracket 156. Movement of the screw 164 up or down will vary the pressure of the roll 148 on the idler roll 144. It should be noted that the press roll assemblies 64 and 66 are used only when the web is slotted for the reinforced hinged folders.

After the web 24 passes through the press assemblies 64 and 66, it will pass through the final drive assembly 72 into a die 74. The die 74 is a conventional type die which is used to cut the web strips 24*a*, 24*b* and 24*c* to length and to simultaneously punch holes 21 in the center strip 24*b*. The center strip 24*b* is then cut in half to form the covers 14 as seen in FIG. 5 by the slitter assembly 75 which is similar to the edge cutters 92 shown in FIG. 10.

The above paragraph describes the basic structure for the press roll assemblies 64, 66, 68 and 70. However, press roll assembly 64 includes means for pressing the tape 18 into the slots 26 in web 24 to form the hinges 25. In this regard, it should be noted that such means comprises a pair of annular beads 145 and 147, respectively, provided on rolls 144 and 148. The beads 145 and 147 are spaced apart a distance corresponding to the distance between slot 26. The beads 145 and 147 will force the tape 18 into engagement in the slots to form the hinge 25. The beads are provided only on roll assembly 64 but can be provided on the other roll assembly 66 if desired.

REINFORCED EDGE FILE FOLDER

The reinforced edge folders 12 are also made on the same apparatus. The slitter assembly 60 and press roll assemblies 64 and 66 are moved to an open position to clear the path for the web 24. Press roll assemblies 68 and 70 may be closed at all times but can be opened to clean the web if desired. A heat sensitive Mylar tape 22 is threaded around idler roll 46, idler roll 54 and then around the surface of heater 56. Although only one tape is shown in the drawing, a heat sensitive Mylar tape may also be applied to the underside of the web if desired.

Figure 15:
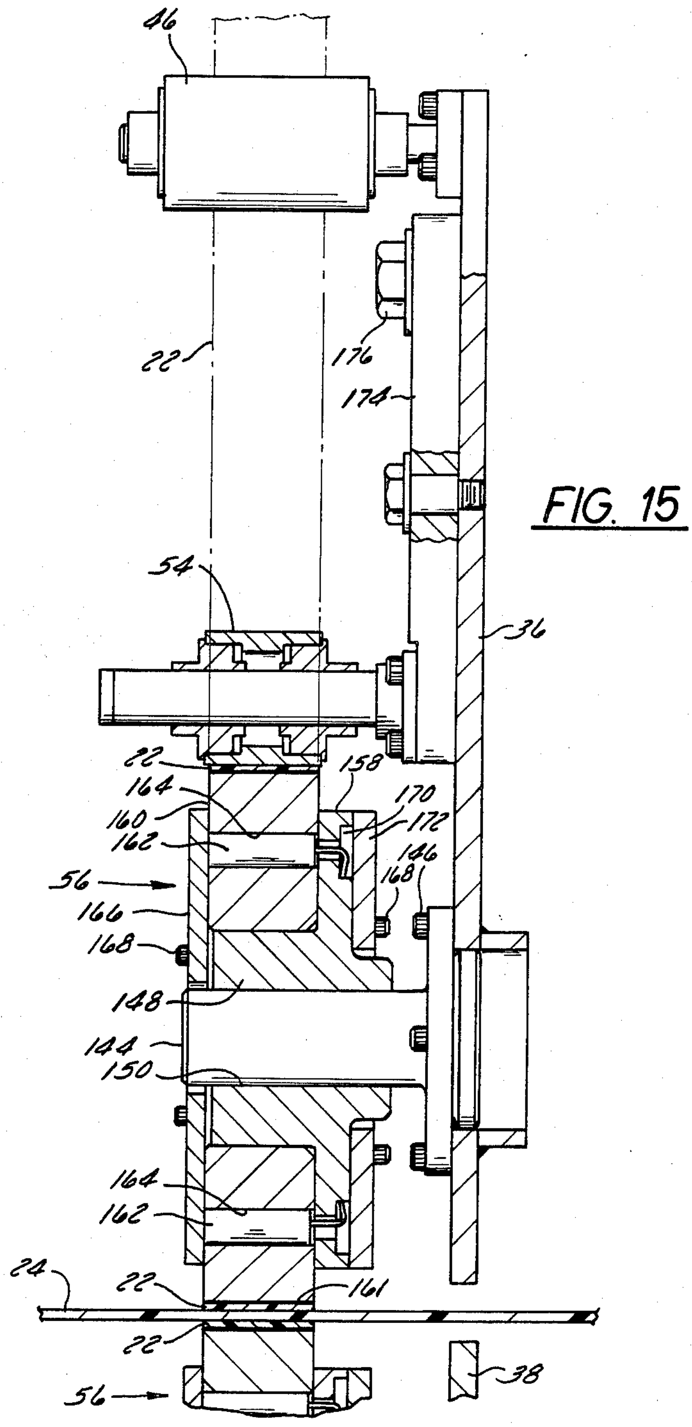
FIG. 15 is a view taken on line 15—15 of FIG. 8 showing the heater assemblies for the heat activated adhesive provided on the Mylar tape.

Each of the heaters 56 as seen in FIG. 15 is mounted on a post 144 which is secured to the panel 36 by means of bolts 146. The heater 56 includes a housing 148 having a central bore 150 and a radial flange 158. A steel ring or disc 160 is mounted on the housing 148 and includes a plurality of heater elements or cartridges 162 positioned in holes 164 provided in the steel ring 160. The steel ring 160 is retained on the housing 148 by means of a plate 166 secured to the housing by bolts 168. The wiring for the heating elements 162 is enclosed in an annular groove 170 provided in the flange 158. The groove 170 is closed by means of a plate 172 secured to the housing by bolts 168. Nine heater elements 162 are provided in the ring 160, however, the number can be changed depending on the heat requirements.

The adhesive on the Mylar tape 22 is activated by the heat of the heating ring 160 as the Mylar tape slides around the outer surface of the steel ring 160. Means in the form of a Teflon coating 161 can be applied to the surface of the ring 160 to prevent sticking. The heating time of the tape 22 can be varied by changing the length of engagement of the tape with the surface of the heater. This is accomplished by means of the idler roll 54 which is supported on bracket 174. The bracket 174 is pivotally mounted on bolt 176 on the panel 36. It will be noted in FIG. 8 that as the bracket 174 is moved clockwise about the pivot pin 176, the idler roll 54 will move Mylar tape 22 away from the surface of the heating ring 160 so that the tape 22 travels over a smaller portion of the outer surface of the ring 160. This can be varied between a minimum of 90 degrees to a maximum of 180 degrees with a corresponding change in the tape heating time.

As the tape 22 leaves the tape heater 56, it engages the web 24 and passes through pressure roll assemblies 68 and 70. These assemblies are substantially the same as assembly 64 as described above. The web 24 then passes through the die 74 and slitter 75.

I claim:

1. An apparatus for forming file folder covers of the reinforced tape hinged type and the tape reinforced edge type said apparatus comprising a base, a guide roll assembly mounted on said base for guiding a pressboard web onto said base, a slitter assembly mounted on said base for cutting a pair of slots in said web to define a reinforcing strip for a hinge reinforced file folder cover, a first set of drive rolls for driving the web across the base, a tape applicator assembly mounted on said base for selectively feeding different tapes onto said web, said assembly including a tape roll support assembly, a first set of idler rolls for guiding a hinge tape onto said web, a glue applicator assembly for applying glue to said first tape prior to application to said web, a first set of pressure rolls for pressing said hinge tape into the slots in said web, a second set of idler rolls for guiding an edge reinforcement tape onto said web, a tape heater assembly for activating the adhesive on said reinforcement tape prior to application to said web, means for varying the heating time of said heater, a second set of pressure rolls for pressing said heat activated tape against said web, a die for cutting said web into predetermined lengths, a second pair of drive rolls for moving said web into said die, and a second slitter assembly for cutting said predetermined lengths of pressboard into front and back covers.

* * * * *